United States Patent [19]

Nasu

[11] 3,886,589

[45] May 27, 1975

[54] VIDEO RECORDING SYSTEM FOR REDUCING FLICKER IN THE SKIP FIELD MODE

[75] Inventor: Takuya Nasu, Osaka, Japan

[73] Assignee: Matsushita Electric Industrial Co., Ltd., Kadoma-shi, Japan

[22] Filed: Sept. 4, 1973

[21] Appl. No.: 394,271

[30] Foreign Application Priority Data

| | | |
|---|---|---|
| Sept. 13, 1972 | Japan | 47-92668 |
| Nov. 25, 1972 | Japan | 47-118401 |
| July 13, 1973 | Japan | 48-79698 |
| July 13, 1973 | Japan | 48-79699 |

[52] U.S. Cl. .......... 360/11; 358/8

[51] Int. Cl. .......... H04b 5/78

[58] Field of Search .......... 360/7, 11, 36; 178/6.7 A, 178/5.2 D, 5.4 CD; 358/8, 6

[56] References Cited

UNITED STATES PATENTS

| | | | |
|---|---|---|---|
| 2,836,650 | 5/1958 | Johnson | 360/11 |
| 2,845,484 | 7/1958 | Johnson | 360/11 |
| 3,255,303 | 6/1966 | Kihara | 360/11 |
| 3,506,778 | 4/1970 | Gold | 178/5.4 CD |
| 3,609,228 | 9/1971 | Goldmark | 178/6.7 A |
| 3,629,491 | 12/1971 | Dann | 360/36 |
| 3,732,381 | 5/1973 | Newell | 360/7 |

*Primary Examiner*—Bernard Konick
*Assistant Examiner*—Alan Faber
*Attorney, Agent, or Firm*—Stevens, Davis, Miller & Mosher

[57] ABSTRACT

This invention contemplates a field skip recording system for television signals wherein after a portion of an original television signal to be recorded is delayed by an amount equal to a certain integer times a field period, the delayed portion is superimposed on the original television signal to obtain a mixed television signal. Signals each of which is a certain integer times one field are successively sampled at an interval of a certain integer times one field so as to be recorded, thereby reducing flickering in pictures reproduced by field skip recording.

7 Claims, 9 Drawing Figures

VIDEO RECORDING SYSTEM FOR REDUCING FLICKER IN THE SKIP FIELD MODE

This invention relates to a magnetic video recording and reproducing system of the field skip type.

When recording with a field skip type magnetic video recording and reproducing system, one-field signals at an interval of one field are successively sampled from a successive television signal, for example, and when reproducing, the same field is twice reproduced successively in order that signal slots which have been missed during recording are filled up.

Accordingly, a magnetic tape required for recording signals is halved in length as compared to that used for a usual recording. However, since signals to be recorded only responds to either odd fields or even fields, the number of pictures to be recorded is halved with the result that flickering is caused in reproduced pictures of television pictures which are characterized by rapid movements.

It is an object of this invention to provide a recording system capable of reducing unnaturalness in displayed pictures obtained by field skip recording.

Another object of this invention is to provide a recording system capable of reducing unnaturalness in displayed pictures of color television signals obtained by field skip recording.

A further object of this invention is to reduce unnaturalness in displayed pictures which is caused when a television signal converted from a movie film is recorded by the field skip method.

According to this invention, a field skip type magnetic video recording and reproducing system for television signals is presented in which unnaturalness of reproduced pictures due to field skip recording is decreased therein.

Figure 1:
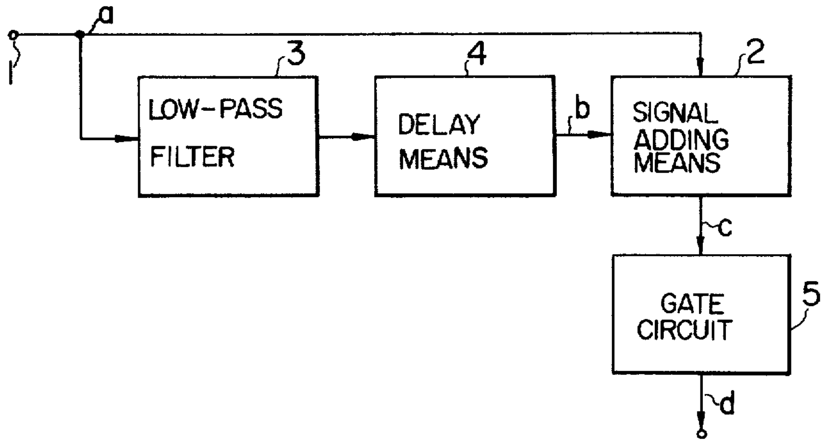
FIG. 1 is a schematic block diagram of one embodiment of the invention.

Referring now to FIG. 1, a successive television signal (hereinafter called an original signal) to be recorded is applied to an input terminal 1 and the original signal *a* is led separately to signal adding means 2 and a low-pass filter 3 for attenuating a color carrier wave.

An output signal of the low-pass filter 3 is delayed a certain integer times the field period in delay means 4 and then applied to the signal adding means 2 where it is added to the original signal *a* at a suitable ratio.

Figure 2:
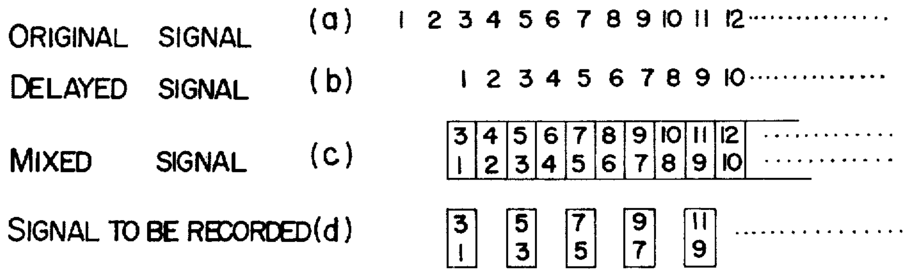
FIG. 2 is a diagram explaining the operation of the system shown in FIG. 1.

More particularly, assuming that numerical orders 1, 2, 3, 4, 5, ..... are assigned to respective fields of the original signal *a* as shown in FIG. 2(*a*), the output of delay means 4 is represented as shown in FIG. 2(*b*) and the original signal *a* and the output *b* of the delay means are added in a suitable ratio in the signal adding means 2 whose mixed television signal outputs *c*, as shown in FIG. 2(*c*), are sampled successively as one-field signals at an interval of one field by means of a gate circuit 5. The sampled signals *d*, as shown in FIG. 2(*d*), are successively recorded thereby to effect a field skip recording.

As a result, since respective fields contain a neighbouring field which is mixed therewith, pictures responding to scenes with a rapid movement are double-imaged in the direction of movement so that running of the scenes is visually smoothed to prevent flickering In principle, it is effective to mix adjacent fields or fields which are missed by the field skip. With the standard television signal, however, it is rational to adopt an odd-odd or even-even field mixing for prevention of decrease in vertical resolution since odd fields and even fields establish an interlaced relation. For this purpose, the amount of delay of the delay means 4 is determined to be either two fields or a certain integer times the two fields. The most desirable mixing ratio of the signals, which differs depending on the content of the pictures, is selected within a range from 1:1 to 10:1.

It is noted that the low-pass filter 3 which might, in principle, be considered unnecessary is provided to prevent mixing of a delayed color signal with an original color signal. The filter 3 is provided because, if the delay means 4 does not operate with a precise delay time, the original color carrier and the delayed carrier sometimes may not be in phase, resulting in interference between the non-delayed and delayed carriers.

As described above, according to this invention signal components of neighbouring fields are superimposed upon the fields which are intermittently recorded, whereby pictures responding to scenes with a rapid movement are double-imaged in the direction of movement so as to display visually smooth running of the scenes.

Figure 3:
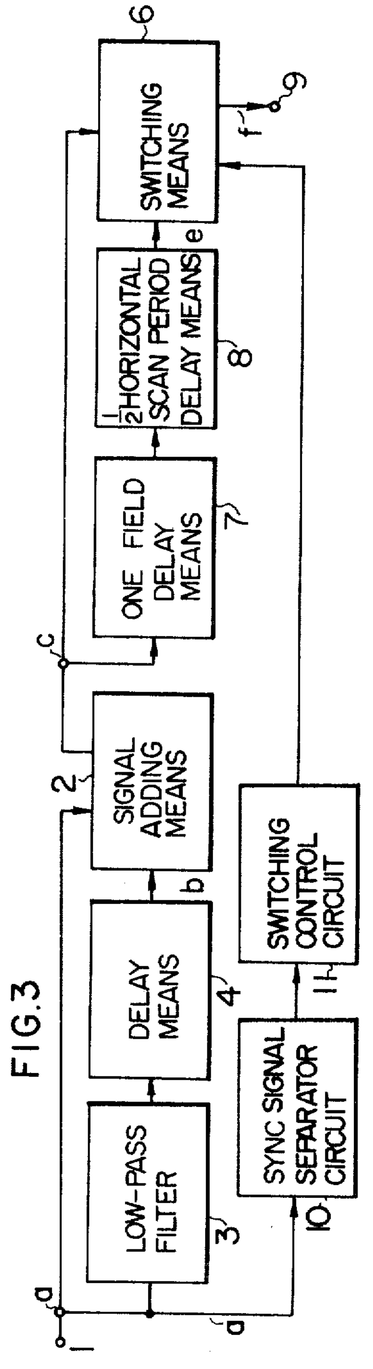
FIG. 3 is a schematic block diagram of a second embodiment of the invention.

Reference is now made to FIG. 3 showing a second embodiment of the invention. In the figure, numeral 1 designates the input terminal for receiving a successive television signal; that is, an original signal *a*which in turn is led separately to signal adding means 2 and a low-pass filter 3 for attenuating a color carrier wave.

An output signal of the low-pass filter is delayed by an amount equal to a certain integer times the field period (two times the field period in this embodiment) in delay means 4 and then applied to the signal adding means 2 where it is mixed with the original signal *a* at a suitable ratio.

More particularly, assuming that numerical orders 1, 2, 3, 4, 5, ..... are assigned to respective fields of the original signal *a* as shown in FIG. 4*a*, the output of delay means 4 is represented as shown in FIG. 4*b* and the original signal and the output of the delay means are mixed at a suitable ratio in the signal adding means 2 whose output *c* is represented as shown in FIG. 4*c*.

It is noted that symbols $$\binom{3}{1} \text{ and } \binom{5}{3}$$

respectively represent a signal consisting of a main component of the third field signal and the first field signal which is mixed therewith, and a signal consisting of a main component of the fifth field signal and the third field signal which is mixed therewith.

The output $c$ is directly conducted to switching means 6 and concurrently therewith its portion is delivered in the form of a signal $e$ to the switching means 6 through one-field delay means 7 and one-half the horizontal scanning period delay means 8.

The switching means 6 serves to select the signals $c$ and $e$ in an orderly manner (in this embodiment at an interval of two fields). Thus, an output signal $f$ to be recorded is obtained at an output terminal 9 such that the main components of odd and even field signals are recorded alternatively.

In other words, when the signal $f$ is switched by the gate circuit 5 as previously described and is recorded in accordance with a field skip recording at an interval of one field, a signal $g$ to be recorded is obtained.

On examining the signal $g$ to be recorded, it will be understood that an alternate recording of signals exclusively containing odd or even field signal components is effected and the signal $g$ contains, irrespective of the types of field skip, all of the information concerning the entire fields in the form of a component signal, thereby ensuring improvement of vertical resolution and interlace as well as prevention of flickering of moving pictures.

The timing for the switching means 6 to select is controlled by a reference signal identical with the synchronizing signal contained in the original television signal. Accordingly, there are provided a synchronizing signal separator circuit 10 for separating the synchronizing signal from the original television signal and a switching control circuit 11 for producing a required switching pulse, so that the switching means 6 is controlled. With this arrangement, the superposition of neighbouring field signals upon the fields to be intermittently recorded ensures the double-images of pictures which respond to scenes with a rapid movement in the moving direction so that running of the scenes is visually smoothed. Furthermore, in this embodiment, all of the informations concerning the entire fields are contained in the form of a component signal and thus the vertical resolution can be improved.

Figure 5:
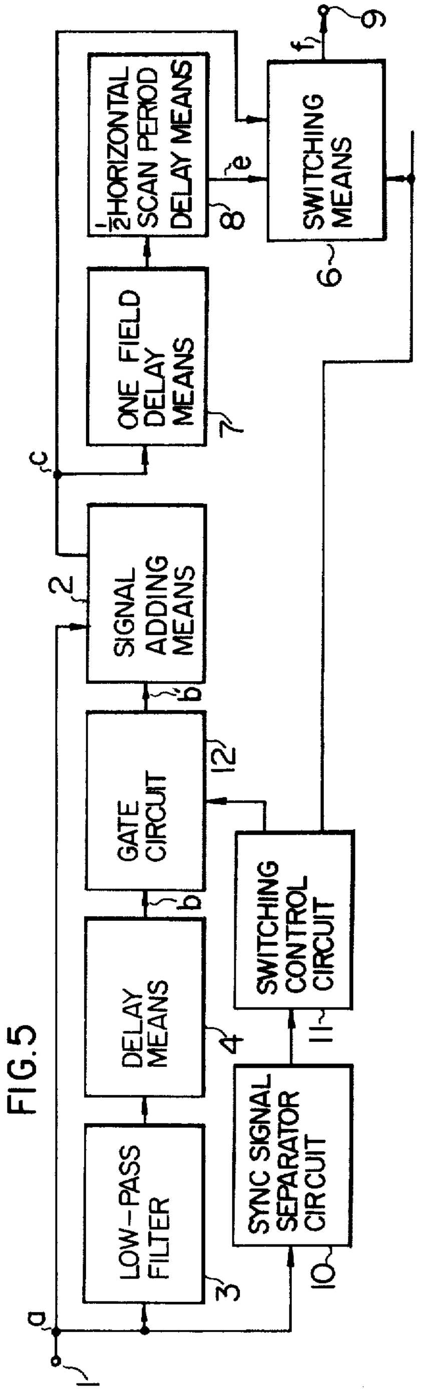
FIG. 5 is a schematic block diagram of a third embodiment of the invention.

Turning now to FIG. 5 showing a third embodiment of this invention, this embodiment differs from FIG. 3 is that the output of the delay means 4 is appled to the signal adding means 2 through a gate circuit 12.

Figure 6:
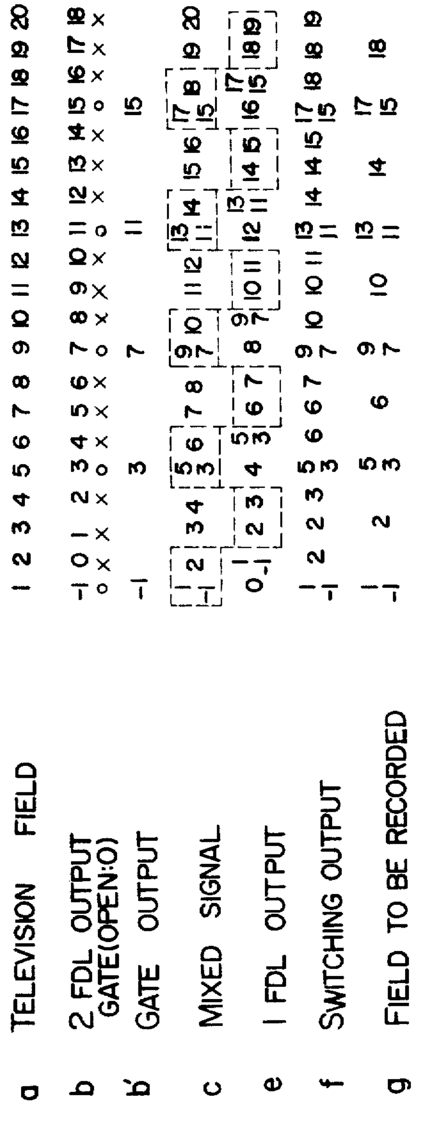
FIG. 6 is a diagram explaining the operation of the system shown in FIG. 5.

The gate circuit 12 is rendered open for one-field period of an interval of three fields as shown in FIG. 6 at symbols o. During its opening, the previously mentioned signal $b$ is passed to the signal adding means 2 in the form of $b$ shown in FIG. 6.

Succeedingly, in the like manner as FIG. 3, the output of the signal adding means 2 is subjected to mixing and switching to produce a signal to be recorded as shown in FIG. 6 at $g$.

For the purpose of controlling the timing for the gate circuit 12 and the switching means 6 to select, a required pulse is produced in the switching control circuit 11.

As compared to the embodiment of FIG. 3 wherein two-field delayed signals are superimposed on the entire fields, this modification mixes only delay signals which have been successively missed through two fields, thereby preventing unwanted reduction in resolution.

It will be understood from the foregoing description what essential constitutions this invention comprises so as to reduce unnaturalness in displayed pictures upon field skip recording; however, the following problem still remains in the conversion of a movie film into a television signal.

Since, in the standard movie picture film, 24 frames are fed per second, it is necessary, for use with an NTSC system, to match 24 frame feeding film with a television system where 30 frames are fed per second by means of the 2 — 3 pull down method.

Figure 7:
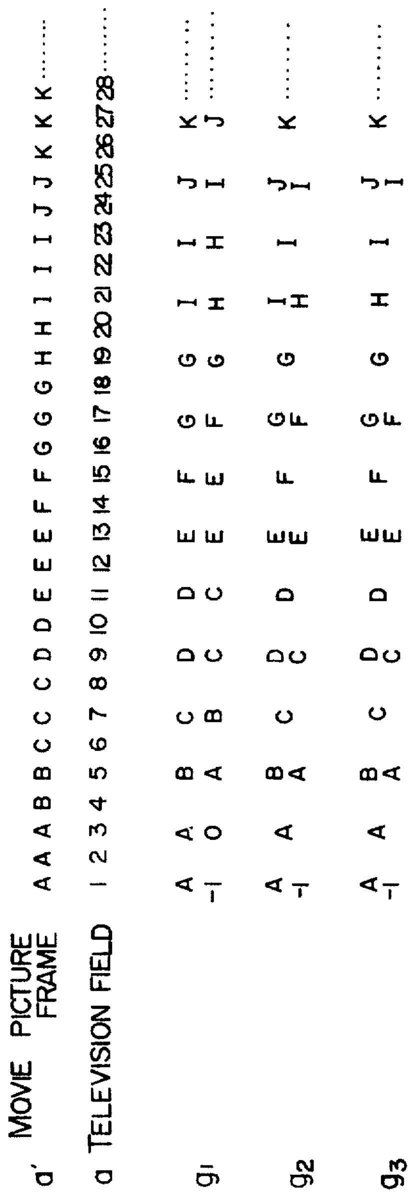
FIG. 7 is another diagram explaining the operation of the system.

In other words, a relation between $a'$ and $a$ shown in FIG. 7 is established for coincidence of the television signal fields 1, 2, 3 . . . with movie picture film frames A, B, C, . . .

Figure 4:
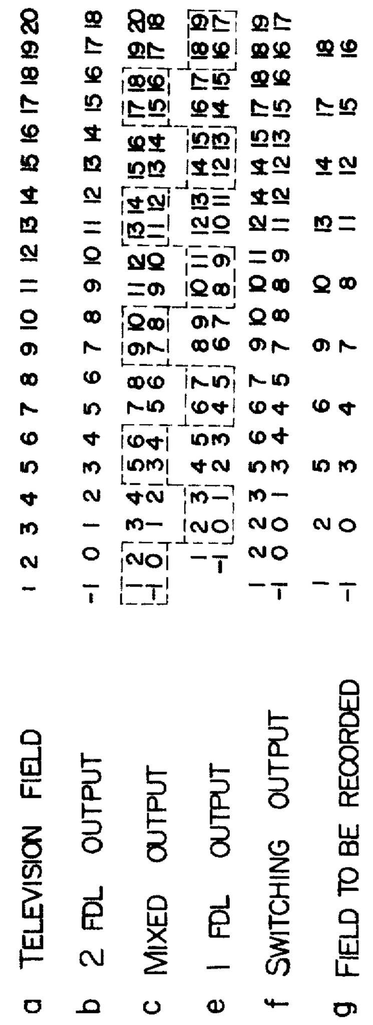
FIG. 4 is a diagram explaining the operation of the system shown in FIG. 3.

When a television signal which is converted from a movie picture film in the above manner undergoes field skip recording (that is, when an actual signal $g$ to be recorded as shown in FIG. 4 in the embodiment of FIG. 3 is traced back to the corresponding frame of the movie picture film) the main component field of signal $g$ cannot include all frames of the movie picture. In other words, frame H is missing as shown in FIG. 7 at the upper line of $g_1$. Further, when a signal $g$ is to be recorded as shown in FIG. 6 in the embodiment of FIG. 5 and is traced back to a frame of the movie picture film, the frames corresponding to H also cannot be included as shown in FIG. 7 at the upper line of $g_2$.

Such missing of fames subsequently takes place at a constant periodic rate. To obviate such problems, for the arrangements of FIGS. 3 and 5 the nineteenth field is substituted for the twenty-first field as shown in $g_3$ of FIG. 7. More particularly, in FIG. 8 a portion of signal $b$ which has been delayed by two fields in the delay circuit 4 is conducted to the switching circuit 6 so as to transfer only the twenty-first to the nineteenth field, thereby preventing the H frames from being missed, as shown in FIG. 7 at $g_3$.

Figures 8, 9:
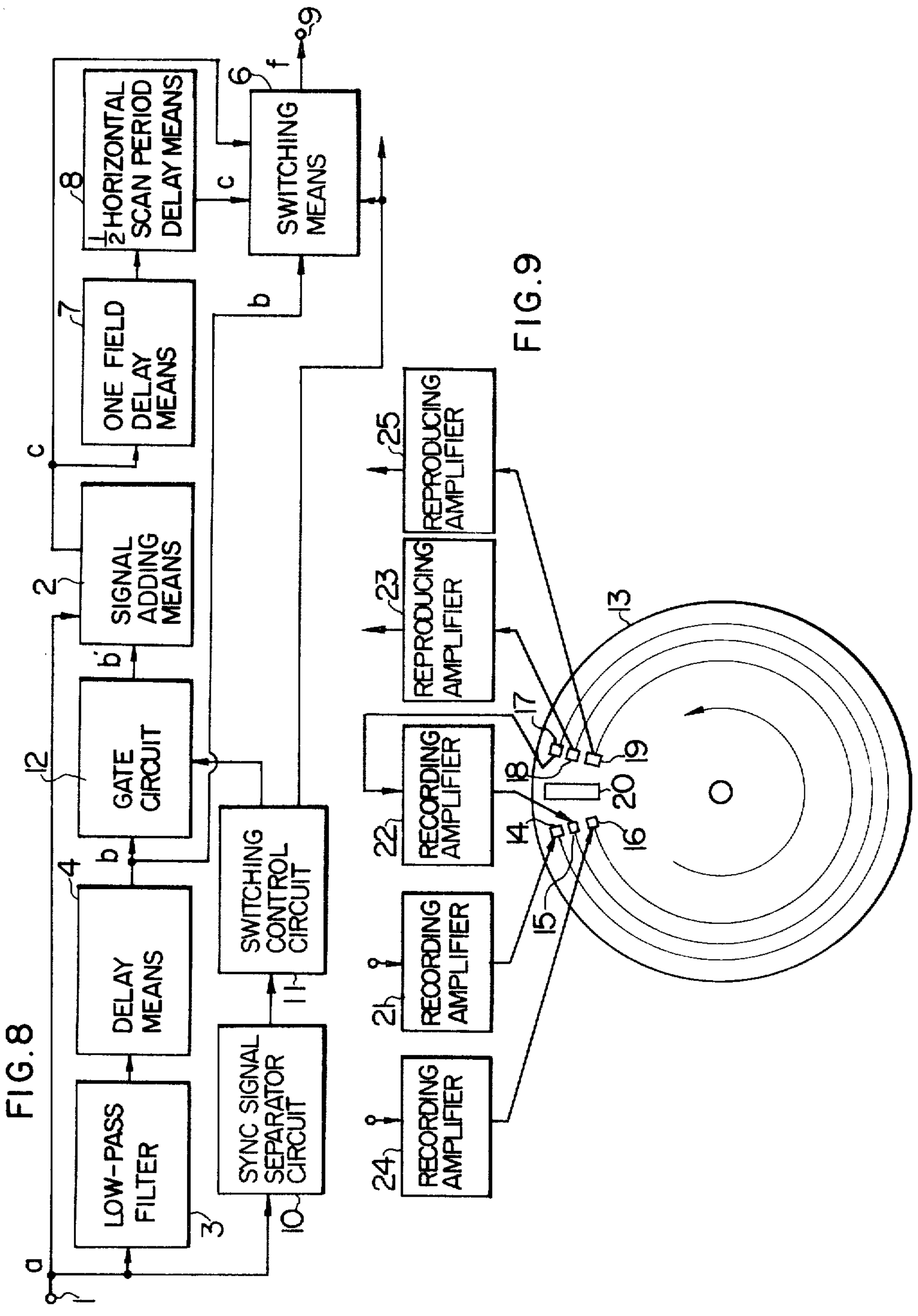
FIG. 8 is a schematic block diagram of a fourth embodiment of the invention.
FIG. 9 is a connection diagram of a preferred delay circuit applicable to the invention.

FIG. 9 shows one example of a two-field delay circuit 4 and a one-field delay circuit 7 which comprises a magnetic disc 13 rotatable at a constant speed (for examaple at 54 revolutions per second which is less than 60 revolutions per second), recording heads 14, 15 and 16, reproducing heads 17, 18 and 19 corresponding respectively to the recording heads 14, 15 and 16 and eraser head 20.

When the magnetic disc is rotated in synchronism with a signal produced by reducing, for example, the vertical synchronizing pulse of input television signal by 9/10, it is possible for the magnetic disc to rotate precisely at the rate of 54 revolutions per second. By selecting the disposition of recording heads 14, 15 and 16 with respect to reproducing heads 17, 18 and 19 such that a one-field period has elapsed before a signal locus recorded on the recording head reaches the reproducing head, a combination of the recording head and the reproducing head functions as a one-field delay line.

Namely, when a signal to be subjected to one-field delay is applied to a recording head 16 through a recording amplifier 24 and the recorded signal is reproduced by a reproducing head 19, a television signal subjected to a one-field delay is obtained as an output of a reproducing amplifier 25.

A signal to be subjected to a two-field delay is applied to a recording head 14 through a recording amplifier 21 and the recorded signal is reproduced by a reproducing head 17; then, the reproduced signal is delivered to a recording head 15 through a recording amplifier 22 so as to be recorded on the disc. The last recorded signal is reproduced by a reproducing head 18 so that a two-field delayed signal is obtained as an output of a reproducing amplifier 23.

What we claim is:

1. A video recording system comprising a signal terminal to which an original television signal to be recorded is applied, delay means for delaying a portion of said original television signal applied to said signal terminal by an amount equal to a certain integer times a field period of each original television signal, means for producing a mixed television signal by adding a delayed television signal from said delay means to said original television signal, means for successively sampling fields from said mixed television signal, each of said samples being taken at an interval of a certain integer times one field, and means for recording the sampled television fields.

2. A video recording system according to claim 1 wherein said original television signal to be recorded is a color television signal and said delayed television signal is the one in which the color carrier signal is attenuated.

3. A video recording system according to claim 1 wherein the delay time of said delay means is twice a field period.

4. A video recording system comprising a signal terminal to which an original television signal to be recorded is applied, first delay means for delaying a portion of said original television signal applied to said signal terminal by an amount equal to twice a field period of said original television signal, means for adding a delayed television signal from said delay means to said original television signal to produce a mixed television signal, second delay means for delaying a portion of said mixed television signal by an amount equal to one-field period, means for alternatively and successively sampling a field from the delayed mixed television signal and from said mixed television signal, the fields to be sampled being each of one field, at an interval of two fields, and means for recording the sampled television fields.

5. A video recording system according to claim 4 wherein the delayed television signal applied to said signal adding means is a one-field signal at an interval of three fields.

6. A video recording system according to claim 4 wherein said first delay means comprises a first recording head engaging a magnetic record medium driven to rotate at the rate of a period greater than the field period of said original television signal for recording a signal to be delayed on said magnetic record medium and a first reproducing head for reproducing a recorded locus after termination of said one-field period, and said second delay means comprises a second recording head engaging said magnetic record medium for recording a signal to be delayed, a second reproducing head for reproducing a recorded locus after termination of said one-field period, a third recording head for recording a reproduced output on said magnetic record medium and a third reproducing head for reproducing a recorded locus after termination of said one-field period.

7. A video recording system comprising a signal terminal to which a television signal to be recorded is applied, said television signal being converted from a movie picture film, first delay means for delaying a portion of said television signal applied to said signal terminal by an amount equal to twice a field period of said television signal, means for adding a delayed television signal from said delay means to said television signal to produce a mixed television signal, second delay means for delaying a portion of said mixed television signal by an amount equal to one-field period, means for successively sampling a field at a predetermined rate from an output of said first delay means, from an output of said adding means, and from an output of said second delay means, the fields to be sampled being each of one field at an interval of two fields, and means for recording the sampled television fields.

* * * * *